United States Patent [19]

Dunn

[11] Patent Number: 4,559,098
[45] Date of Patent: Dec. 17, 1985

[54] NITRIDE ETCH BATH

[75] Inventor: Joseph V. Dunn, Santa Clara, Calif.

[73] Assignee: Azonic Technology, Inc., San Jose, Calif.

[21] Appl. No.: 658,262

[22] Filed: Oct. 4, 1984

Related U.S. Application Data

[63] Continuation-in-part of Ser. No. 496,834, May 23, 1983, Pat. No. 4,475,977.

[51] Int. Cl.[4] .......................... B44C 1/22; C03C 15/00; C03C 25/06
[52] U.S. Cl. .................................... 156/345; 156/626; 156/627; 159/28 R
[58] Field of Search ............... 156/345, 626, 627, 637, 156/642, 379, 436; 159/28 R; 134/12, 105

[56] References Cited

U.S. PATENT DOCUMENTS 3,677,848 7/1972 Stoller et al. ................... 156/626 X
4,233,106 11/1980 Goffredo ........................... 156/627

OTHER PUBLICATIONS

IBM Technical Disclosure Bulletin, vol. 15, No. 2, Jul. 1972, Controlling Etching Conditions of Silicon Nitride $Si_3N_4$, Miller et al., pp. 667–668.
IBB Technical Disclosure Bulletin, vol. 17, No. 7, Dec. 1974, Multiple Sensor, Enol–Point Etch Detect System, Dhaliwal et al., pp. 1946–1947.

Primary Examiner—William A. Powell
Attorney, Agent, or Firm—Thomas E. Schatzel

[57] ABSTRACT

An acid bath including an inner vessel, having non-opaque wall sections, is sealingly mounted within an outer housing with electric heating elements mounted therebetween. A condensing lid is mounted to enclose the inner vessel to prevent escape of acid fumes therefrom, an optical-type sensor is mounted to transmit and receive optical signals through the non-opaque walls to determine liquid level within the vessel.

10 Claims, 8 Drawing Figures

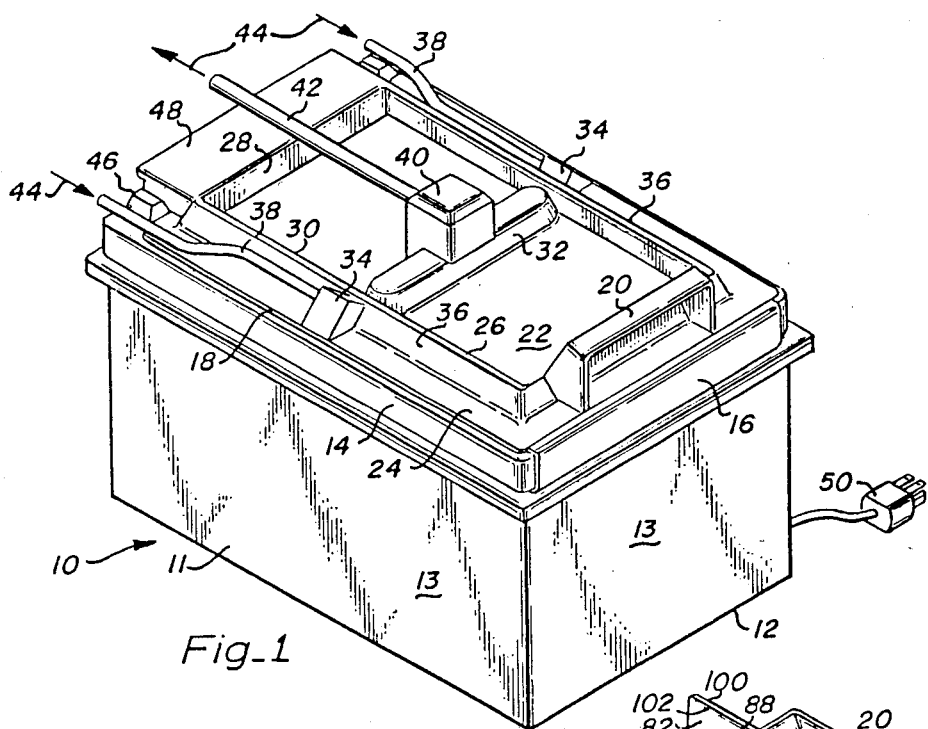

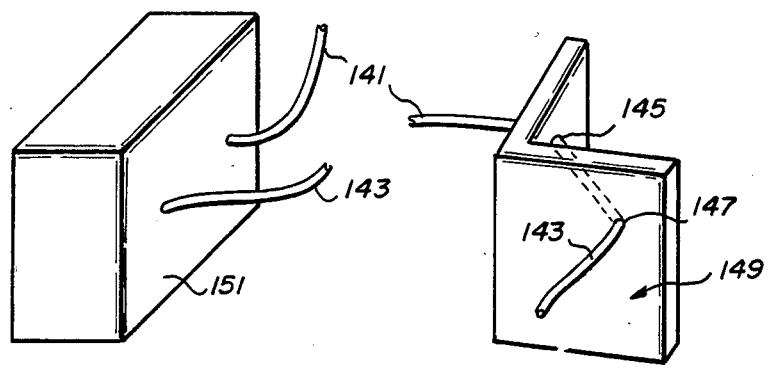
Fig_4
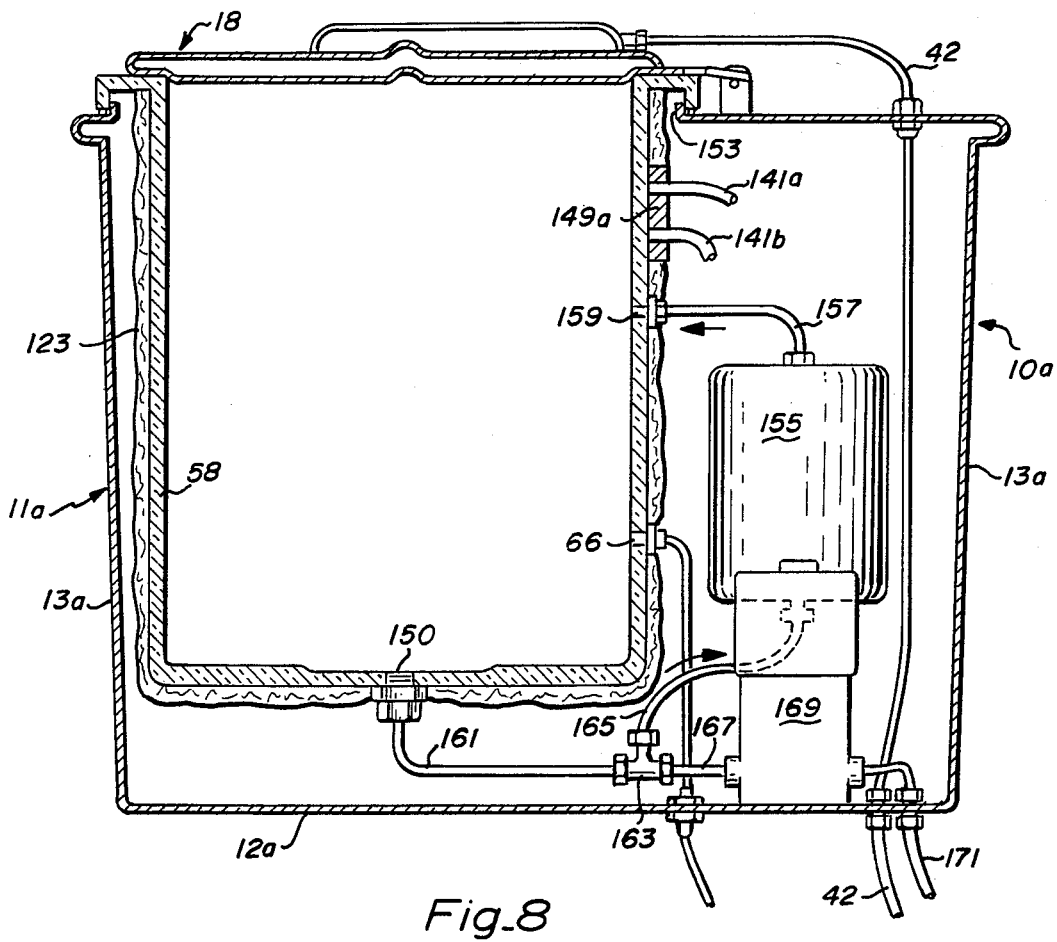
Fig_8

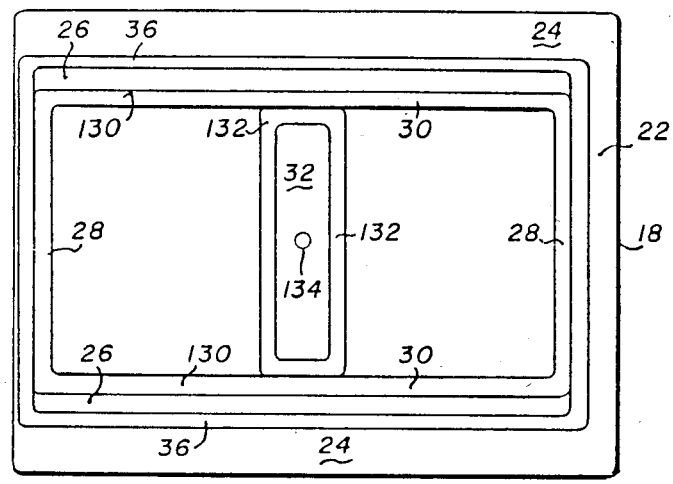
Fig_5
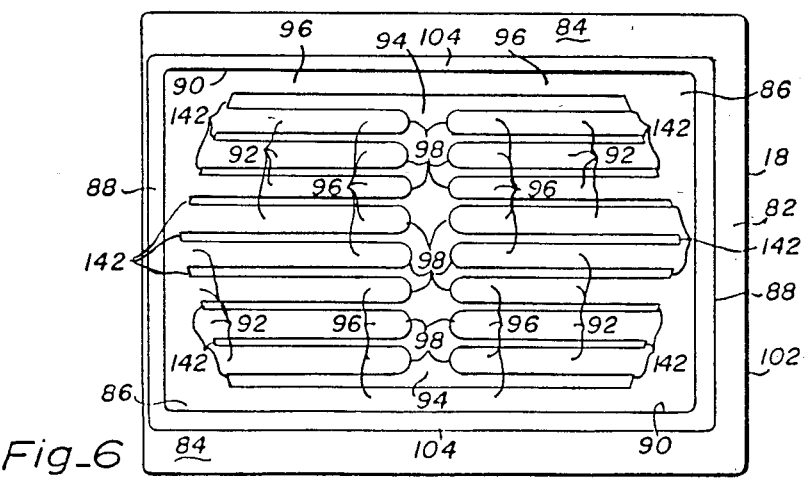
Fig_6
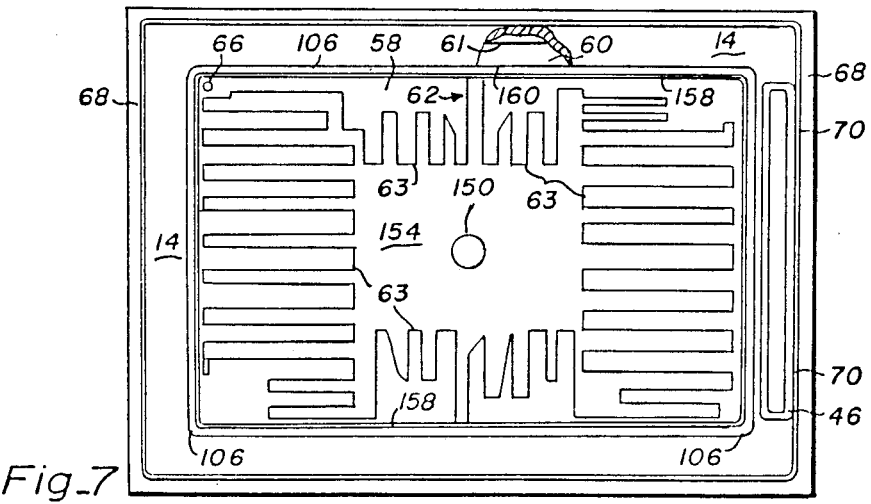
Fig_7

NITRIDE ETCH BATH

RELATED APPLICATIONS

This application is a continuation-in-part of my prior United States patent application Ser. No. 06/496,834 filed May 23, 1983, and issued as U.S. Pat. No. 4,475,977 on Oct. 9, 1984.

BACKGROUND OF INVENTION

1. Field of the Invention

The invention relates generally to acid baths and more particularly to acid baths wherein the evaporation rate of the water vapor emitted from the bath must be controlled.

2. Description of the Prior Art

In the semiconductor industry, boiling acid in a bath is utilized in the manufacturing process to etch away exposed areas of a water. A problem exists in that acid has a high concentration of water and at high temperatures (140-180)° C., the water evaporates at a rapid rate because water boils at 100° C. If the water in the acid evaporates, the chemical concentration in the bath varies changing the pH of the acid and in the extreme results in straight acid. If the solution becomes straight acid, a condition known as "heavy acid" results which accelerates the etching process. Under these conditions, an operator cannot control the etch rate in the bath. A solution to this problem is to control the evaporation rate of the water in the acid.

Attempts to solve this problem in the prior art included adapting a collar to fit over the top of a rectangular acid bath. The collar was constructed with an inlet to and an outlet from a series of quartz coils. The quartz coils carried a condensing medium and the quartz coils were suspended adjacent to the inner walls of the acid bath. A quartz lid rested on top of the collar and as the vapor fumes rose from the bottom of the acid bath the quartz lid reflected the fumes towards the collar. The collar then condensed to a liquid state those fumes that contacted the collar. A major problem with this solution was that if the water pressure changed, as when the system valves were not closed when the system was not utilized, the quartz collar would shatter due to stress caused by a sudden increase in water pressure. The quartz lids, being very heavy, were also subject to breakage and were expensive to replace. The quartz lid also leaked acid vapor droplets when removed from the acid bath making removal a hazard.

Another attempt to prevent the loss of water vapor from the acid bath included the fitting of the walls of the acid bath with teflon coils. As in the prior art, a heavy dense lid was placed over the acid bath. The heavy dense lid performed in the same manner as the quartz lid with all the previously described problems. The dense lid reflected the acid vapor fumes at the top of the bath and the teflon coils mounted on the bath walls performed the condensing function. As before, the side-mounted coils were not efficient and the teflon on the condensing coils proved to be a thermasl insulator further reducing the efficiency. A third attempt to prevent the loss of water vapor from the acid bath included mounting U-shaped condensing coils on the bottom of a quartz lid mounted on a quartz acid bath.

Another problem existed in sensing the liquid level in the acid bath. If the level dropped, the heater element could reach sufficiently high temperatures to destroy itself. Attempts to solve this liquid-level sensing problem included using a thermocouple within the bath. However, such devices often failed to operate accurately. Moreover, any such level-determing instrument located within the bath can cause contamination of the acid as well as destruction to the instrument due to acid.

SUMMARY OF THE PRESENT INVENTION

It is an object of the present invention to provide an improved acid bath capable of more efficiently controlling the pH of the acid bath, reducing replacement water requirements at high temperatures, and increasing etch yields.

It is a further object to provide an improved acid bath having relatively non-breakable and non-flammable components capable of resisting the corrosive effects of acid.

It is a further object to provide an improved acid bath capable of reliably operating at higher temperatures.

In accordance with the preceding objects, a preferred embodiment of the improved acid bath of the present invention includes an outer housing having a bottom wall and upstanding side walls; an inner vessel for containing liquid acid, which vessel has a bottom wall and upstanding sidewalls dimensioned for sealingly mounting within the outer housing such that there is an enclosed space between the walls of the inner vessel and the walls of the outer housing; non-opaque sections formed in two of the sidewalls of the inner vessel; liquid level sensor means including a signal processing means including an infrared transmitter and receiver means mounted outside the outer housing and at least one pair of light channel means optically coupled to the transmitter and receiver means to extend therefrom to a position intermediate the sidewalls of the outer housing and the inner vessel; and means fixedly mounting the respective terminal ends of the light channel means to direct and receive light through the non-opaque sections of the sidewalls at a predetermined level relative to the sidewalls, without pentrating the sidewalls. In operation of the present invention in this embodiment, optical signals are originated by the signal processing means and are carried, via the first light channel of the pair, for transmission through the non-opaque sections of the sidewalls of the inner vessel for reception by the other light channel of the pair. In one mode of operation, if liquid acid fills the inner vessel to the predetermined elevation at which the distal ends of the light channels are mounted, such liquid causes diffraction of the transmitted light, thereby effectively blocking reception of the transmitted light by the other channel. Then, in this mode of operation, if the level of liquid acid within the inner vessel falls below the level at which the light channels are mounted, transmitted light will be received by the second light channel means and such reception can be utilized, via the signal processing means, as an indication of the low acid level as well as to control other functions of the system. In a second mode of operation, the pair of light channel means are located such that reception of optical signals indicates that liquid acid fills the inner vessel to the level at which the channels are mounted.

A further advantage is that means are provided to efficiently control the pH of the acid bath, reducing replacement water requirements at high temperatures, and increasing etch yields by minimizing contamination.

A further advantage is that the acid bath has lightweight, relatively non-breakable, and non-flammable components capable of resisting the corrosive effects of acid.

A further advantage is that the acid bath is capable of operating at a higher temperature permitting shorter production cycles relative to comparable acid baths heretofore available.

These and other objects and advantages of the present invention will no doubt become obvious to those of ordinary skill in the art after having read the following detailed description of the preferred embodiment which is illustrated in the various drawing figures.

IN THE DRAWING

FIG. 1 is a perspective view of an acid bath;

FIG. 2 is an interior perspective view of the acid bath of FIG. 1;

FIG. 3 is a plan view of the condenser lid insert exhaust ports of the acid bath of FIG. 1;

FIG. 4 is a pictorial diagram of a liquid level sensor system for use with the acid bath of FIGS. 1 and 2;

FIG. 5 is a plan view of the condenser lid top portion of the acid bath of FIG. 1;

FIG. 6 is a plan view of the condenser lid bottom portion of the acid bath of FIG. 1;

FIG. 7 is a plan view of the inner vessel of the acid bath of FIG. 1; and

FIG. 8 is a cross-sectional view of an auxillary liquid circulation system for usage with baths, as shown FIGS. 1 and 2.

DETAILED DESCRIPTION OF THE PREFERRED EMBODIMENT

In FIG. 1, there is illustrated an acid bath referred to by the general reference character 10 including an outer housing 11, an outer housing base 12, a plurality of vertical walls 13, a condensing collar 14 with a retaining ring 16 and a condensing lid 18 with a molded handle 20. The condensing lid 18 further includes a top portion 22, a first planar layer 24, an enclosed molded rectangular peripheral channel 26, a short dimension 28 and a long dimension 30 of the peripheral channel 26, an enclosed rectangular shaped cavity 32, a pair of insert ports 34, a pair of external sides 36 of the long dimension 30, a pair of insert ducts 38, and exhaust port 40, and an exhaust duct 42. Also shown in FIG. 1 is a condensing medium 44, a raised portion 46 of condensing collar 14, a hinge cover 48, and an electrical connection 50.

In FIG. 2, the interior of the acid bath 10 includes an inner vessel 58 forming an acid bath 59, a continuous first flange lip 60, a plurality of edges 60 of the first flange lip 61, an electrical heater element 62, a plurality of electrical heater conductors 63, a thermal disc 64, a temperature sensing element 66, a second flange lip 68, a top exterior surface 69 of the outer housing 11, and a hinge 70. The inner vessel 58 is preferrably formed of non-opaque quartz or a similar glass material able to withstand high temperatures and acidic conditions.

Outer housing 11 includes a continuous top edge 75 about the vertical walls 13, and a base center penetration 76. FIG. 2 also shows a bottom portion 82 of condenser lid 18, a second planar layer 84, an enclosed molded rectangular surface 86, a short dimension 88 and a long dimension 90 of the rectangular surface 86, a plurality of molded enclosed horizontal fingers 92, a pathway 94 on the second planar layer 84, a plurality of enclosed canals 96, a plurality of terminal ends 98 of each of said fingers 92, a backside 100 of said top portion 22, a backside 102 of said bottom portion 82, an upward sloping bottom peripheral edge 104 of the enclosed molded rectangular surface 86, and a downward sloping inner peripheral edge 106 of condensing collar 14.

In FIG. 3 there is shown the top portion 2 of the condensing lid 18 further including a pair of insert hose adapters 110, a pair of insert O-clips 112, an exhaust hose adapter 114 adapted to receive an exhaust O-clips (not shown), a junction hose adapter 118, a pair of junction O-clips 119 and a hinge rod 120 (shown in phantom).

In FIG. 5 there is shown the top portion 22 of the condensing lid 18 further including a pair of internal sides 130 of the long dimension 30, a sloping exterior side 132 of the rectangular shaped cavity 32, and an exhaust opening 134. In FIG. 6 there is shown the bottom portion 82 further including a plurality of separation spaces 142.

FIG. 7 illustrates a plan view of the inner vessel 58 further showing an inner vessel drain plug 150, the inner vessel bottom 154, the vertical sides 158 and a continuous top 160 along the vertical sides 158.

Referring again to FIG. 1 the outer housing 11 includes the base 12 and the plurality of vertical walls 13 connected to the base 12. The outer housing 11 is open at the top and the base 12 includes a base center penetration 76 (shown in FIG. 2). The electrical connection 50 to the heater elements enters through outer housing 11. The outer housing 11 is comprised of a non-breakable, lightweight, non-flammable plastic discussed herein. Integrally molded to a top exterior surface 69 (shown in FIGS. 2 and 4) of the vertical walls 13 of the outer housing 11 is the continuous second flange lip 68 (shown in FIG. 2). The purpose of the second flange lip 68 is to permit the nitride etch bath 10 to be supported or suspended.

As shown in FIG. 2, the inner vessel 58 is mounted within the outer housing 11. The inner vessel 58 includes the plurality of vertical sides 158 connected to the bottom 154. Connected to the continuous top 160 of the vertical sides 158 is the continuous first flange lip 60. The first flange lip 60 is then sealed to the continuous top edge 75 of the vertical walls 13 of the outer housing 11. The purpose of the inner vessel 58 is to contain a bath of aqueous acid.

The condensing collar 14 shown in FIGS. 1 and 2 is also comprised of the inert, non-breakable, non-flammable plastic which is also acid resistant. The condensing collar 14 is mounted above and formed to cover the continuous first flange lip 60. Condensing collar 14 also includes the downward sloping inner peripheral edge 106 (also shown in FIG. 7). The downward sloping inner peripheral edge 106 is in physical communication with the first flange lip 60 of the inner vessel 58 and provides a surface for sealing the inner vessel 58 against liquid evaporation. The condensing collar 14 is secured in position above the first flange lip 60 by the retaining ring 16. The retaining ring 16 may be mounted about each of the plurality of edges 61 or about fewer than each of the edges 61. The retaining ring 16 is mounted under the edges 61 and is heat sealed to the condensing collar 14 at the edges 61. At one end of the condensing collar 14 is the raised portion 46 used to support the hinge 70. The hinge 70 permits the condenser lid 18 to rotate relative to the condensing collar 14. The condensing lid 18, which is mounted above and hinged to condensing collar 14, includes the upward sloping bottom peripheral edge 104 (also shown in FIG. 6). When the condensing lid 18 is closed, the upward sloping bottom peripheral edge 104 of the condensing lid 18 seals to the downward sloping inner peripheral edge 106 of the condensing collar 14. The condensing lid 18 also includes the cycling condensing medium 44 for controlling the evaporation rate of the water component within the acid bath 59 when operating at high temperature within the inner vessel 58.

The condensing lid 18 includes the top portion 22 (shown in FIGS. 1 and 4) and the bottom portion 82 (shown in FIGS. 2 and 6). The top portion 22 includes the molded handle 20 for lifting the lid 18 as it pivots about hinge 70 and the first planar layer 24 which acts as a reference plane. The enclosed molded rectangular peripheral channel 26 is raised vertically above the first planar layer 24 with the short dimension portions 28 and connected with the long dimension portions 30. The enclosed rectangular shaped cavity 32 is raised vertically above the planar layer 24 and is orthogonally center positioned within the long dimension portion 30. The peripheral channel 26 communicates with the insert ports 34 which are centrally mounted about the external side 36 of the portion 30 of the peripheral channel 26. The insert ports 34 accept the insert ducts 38 and the cavity 32 includes the exhaust port 40 which accepts the exhaust duct 42. The condensing medium 44, as shown in FIG. 1, enters the peripheral channel 26 via the insert ports 34 and leaves the rectangular shaped cavity 32 via the exhaust port 40. The hinge cover 48 is mounted atop the raised portion 46 of the condensing collar 14. In FIG. 5, the top portion 22 of lid 18 is shown without the condensing collar 14. Opposite each of the external sides 36 of peripheral channel 26 is one of the internal sides 130. Also the sides 132 of the formed cavity 32 slope down to the first planar layer 24. Additionally, the exhaust opening 134, where the condensing medium 44 is expelled, is visible in FIG. 5.

Referring again to FIGS. 2 and 6, and the bottom portion 82 of the condensing lid 18, the molded rectangular surface 86 rises vertically above the planar layer 84 as do the fingers 92 which extend inward from surfaces 88 (shown best in FIG. 6). Both sets of fingers 92 terminate to form the exterior pathway 94. Each canal 96 is formed between surface 86 and each terminal end 98 of each horizontal finger 92. As illustrated in the cutaway of FIG. 2, the backside 100 of the top portion 22 is permanently affixed to the backside 102 of the bottom portion 82. The cycling condensing medium 44 is then forced into each of the insert ports 34 and simultaneously flows to each of the short dimensions 88 of the rectangular surface 86, through each of the enclosed canals 96, and out each finger terminal end 98. The terminal ends 98 terminate into the bottom of the rectangular shaped cavity 32 of the top portion 22. The condensing medium 44 exits through cavity 32 through the port 40 after cooling the bottom portion 82 of the condensing lid 18. Note that the horizontal fingers 92 are separated from each other via the separation spaces 142.

Referring to FIG. 3, the insert hose adaptors 110 are connected to the insert ports 34. The insert O-clips 112 physically connect the insert ducts 38 to adaptors 110. The exhause hose adaptor 114 is connected to the exhaust port 40 and an exhaust O-clip to the exhaust duct 42. The junction hose adaptor 118 connects each duct 38 with the junction O-clip 119 locking the ducts 38 to the adaptor 118. Also, hinge rod 120 connects the condensing lid 18 to the condensing collar 14 via hinge 70 as shown in phantom.

FIG. 4, generally speaking, shows a liquid level sensor which is comprised of the infrared transmitter and receiver housed in a signal processing means 151 for mounting outside the outer housing to avoid, inter alia, exposure to acid fumes from inner vessel 58. A pair of light channels 141 and 143 are optically connected to the signal processing means 151 and extend for mounting intermediate the vertical walls 13 of the outer housing 11 and the vertical sides 158 of the inner vessel 58 of FIGS. 1 and 2.

Referring now to FIG. 4 in more detail, the pair of light channel means 141 and 143 of the optical liquid level sensor comprises a pair of fiber optic strands (or a pair of bundles of strands). One end of the fiber optic strand 141 is fixedly mounted within a channel 145 formed through a positioning member generally designated 149. Likewise, one end of the strand 143 is fixedly positioned within a second channel 147 also formed in the positioning member 149.

Preferably, the positioning member 149 is L-shaped in cross-section and is contoured to fit at a right-angle corner of the inner vessel 58 so that the faces at the ends of the fiber optic strands are parallel to one another across the right-angle corner.

This is readily accomplished by having, for example, a common centerline for the channels 145 and 147 so that there is a clear line of sight through the channels. The positioning member 149 is shaped and dimensioned so that it can readily be accomodated within the space between the sidewalls 13 of outer housing 11 and the vessel 58. The positioning member 149 is secured in position by gluing or other means so that the distal ends of the fiber optic strands 141 and 143 are positioned at the elevation above the bottom 154 of the inner vessel at which the liquid level in the acid bath is to be monitored. Accordingly, the end faces of fiber optic strands 141 and 143 are held against the non-opaque sides of the vessel 58 without penetrating the wall of the vessel.

The opposite ends of the fiber optic strands 141 and 143 are connected to the signal processing means 151 for transmitting and receiving signals via the fiber optic strands. More specifically, the circuitry within the means 151 is conventional and is designed to transmit optical signals, preferably ones within the infrared spectrum, through one of the fiber optic strands, say strand 141, and to detect whether such an optical signal is received through the other fiber optic strand 143. Accordingly, the signal processing means 151 generally includes a source of optical energy and a light-responsive means, such as a light-sensitive transistor or triac, responsive to the optical energy received through the fiber optic strand 143. (Such parallelism between the end faces of the fiber optic strands 141 and 143 is indicated in FIG. 2 by the dashed lines.) To determine whether there is liquid acid within the inner vessel 58 at the monitored level, an optical signal is transmitted from the means 151 through the fiber optic strand 141; if liquid acid is not present within the vessel 58 between the distal ends of the strands 141 and 143, the transmitted optical signal from strand 141 will be received by the strand 143 and will be carried to the signal processing means 151. However, if liquid acid is present within the inner vessel 58 at the monitored level, such liquid will cause scattering or diffraction of the optical signal transmitted from strand 141, thereby essentially blocking reception of the signal by the second fiber optic strand 143. Reception, or non-reception, of an optical signal is monitored by the signal processing means 151. Typically, the signal processing means 151 will respond to non-reception of an optical signal by providing a sensory output, such as illumination of a warning lamp or the like, to indicate that the level of liquid acid within the inner vessel 58 has fallen below the pre-established monitoring level. In addition, the level detection output of the signal processing means 151 can be utilized to control other functions such as the heating elements for the vessel 58.

In another mode of operation, the light channels 141 and 143 are both mounted to the same wall of the vellel 58, substantially adjacent one another at the same elevation. In this mode, if liquid is present in the vessel 58 at the elevation of the mounted ends of the light channel, the liquid will reflect light back from the transmitting channel 141 to the recieving channel 143. Accordingly, in this case, the presence of an optical signal at the signal processing unit 151 will serve as an indication that liquid is present in the vessel 58, and the absence of a received optical signal will indicate that no liquid is present at the monitored level.

Since an objective of the present invention is to prevent evaporation of water from the acid bath 59 so that the pH concentration in the inner vessel 58 remains constant, the plastic condensing lid 18 and collar 14 are utilized. Since the condensing medium 44 is forced through both sections of fingers 92 of the lid 18 in a balanced simultaneous manner, the entire bottom portion 82 remains at a constant temperature. An important feature in preventing water evaporation is to provide a condensing lid 18 with a bottom portion 82 that provides a large surface area for cooling. This, the waffle effect of the fingers 92 achieves this objective. Note that since the condensing medium 44 may be either cooling water or nitrogen, the condensing lid 18 is hermetically sealed for minimizing the loss of the condensing medium 44. The hermetically sealed condenser lid 18 will not leak even if the lid 18 is under pressure. Thus, as the water vapor rises in the inner vessel 58, the vapor strikes the cool bottom portion 82 of the condensing lid 18 and condenses back to a liquid prior to evaporating. The condensing lid 18 acts as a reflex radiator for the released vapors and prevents the vapors from escaping. The condensing collar 14 is designed in a mold and contoured to slope downward forming the downward sloping inner peripheral edge 106 which fits flush with the upward sloping bottom peripheral edge 104 of the bottom portion 82 of the condensing lid 18. Thus, a vapor-tight snug fit results because of edges 104 and 106, the heat produced by the electrical heater 62, and the weight of the condensing medium 44 when cooling water is used. The condensing collar 14 also provides the lid 18 with hinge support and will accommodate various acid bath manufacture types. If the acid is not permitted to become heavy, the etch rate may be controlled and the production yield predicitions are more valid. Thus, etching at high temperatures results in a faster controlled etch rate with increased production.

Referring now to FIGS. 2 and 7, the electrical heating element 62, comprised of the plurality of electrical conductors 63, is sandwiched between the base 12 and vertical walls 13 of the outer housing 11 and the bottom 154 and vertical sides 158 of the inner vessel 58. The electrical heater 62 and electrical conductors 63, best shown in FIG. 6, increase the temperature of the acid bath 59 within the inner vessel 58. The electrical heating element 62 also includes the temperature control means or thermal disc 64 which automatically regulates the temperature of the acid bath 59. The thermal disc 64 interrupts the electrical heating element 62 when the temperature of the acid bath 59 reaches 185° C. The temperature sensing element 66 automatically senses the temperature of the acid bath 59 within the inner vessel 58. The temperature sensing element 66 may be a less accurate thermocouple comprised of dissimilar metals or a more accurate but fragile glass probe thermistor.

The outer housing 11, condensing collar 14, and condensing lid 18 are each comprised of an inert, non-breakable, non-flammable acid resistant plastic. The plastic is made of polyvinlidene fluoride and referred to as a sygef which resists the corrosive effects of acid. Sygef is listed (UL-94) by Underwriter Laboratory as a self-extinguishing plastic and is as inert as quartz but is unbreakable. The condensing lid 18 is vacuum formed and by using the waffle effect of fingers 92, the large surface area makes it a good thermal conductor. Sygef has a heat limitation of 140° C. but by forcing the condensing medium 44 through the canals 96, the lid 18 can be used at temperatures above 140° C. and no contaimination results to lower production yields.

By the addition of the condensing collar 14, the retaining ring 16, and the condensing lid 18 with the hinge rod 120, an acid bath may be converted to a nitride etch bath 10. The condensing collar 14 becomes a permanent part of the inner vessel 58 and the lid 18 hinges relative to the collar 14. Thus, a modular feature exists because the condensing lid 18 is adaptable to other manufacturer's acid baths.

FIG. 8 illustrates an auxillary liquid circulation system for use with the previously described acid bath. For purposes of convenience components in FIG. 8 which are substantially the same as those described earlier are designated with a subscript; thus, the outer housing is designated 10a in FIG. 8 to indicate that it is substantially the same as the housing 10 of FIGS. 1 and 2, even though there may be some differences in the shape or other details of the housings.

In the system in FIG. 8, the outer housing 11a includes a bottom wall 12a to which are attached upstanding sidewalls 13a to define an enclosure having a receiving opening 153 formed at its top. Sealingly mounted within the receiving opening 153 is the inner vessel 58 for containing a body of liquid acid. As in the earlier described embodiments, the top of the vessel is closed by a hinged condensing lid 18, heating means (not shown) are disposed to directly heat the vessel, and a layer of insulation 123 is provided to thermally insulate the vessel from the interior of the housing 11a. Also, a heat sensing element 66 is mounted in contact with the exterior of the sidewall of the vessel 58 to monitor the temperature therein, normally about 185° C., and to control the heating means accordingly.

As also shown in FIG. 8, a liquid-carrying conduit 161 is mounted in sealed communication at its one end with the aperture 150 in the bottom of the vessel 58. The other end of the conduit 161 is connected to a tee-fitting 163 from which leads a second conduit 165 to carry liquid to a heater device 155.

The tee-fitting 163 also receives a third conduit 167 which sealingly extends to a valve 169 which is interposed between the conduit 167 and a liquid carrying conduit 171 which is connected, at its opposite end, to a source of make-up water or acid. From the heater means 155 extends another liquid-carrying conduit 157 whose opposite end is sealingly located in liquid-flow communication with an aperture 159 formed through the sidewall of the vessel 58.

With the foregoing description in mind, the operation of the system of FIG. 8 may be readily understood. In normal operation, the heater 155 is energized, and make-up water or acid is allowed to flow through conduit 171 and valve 169 into the tee-fitting 167. The amount of make-up water or acid is controlled by the valve 169. Concurrently, aqueous acid flows from the vessel 58, via outlet 150 and conduit 161, into the tee-fitting 163. From the tee-fitting 163, the solution of aqueous acid flows through conduit 165 and into the heater 155. The purposes of the heater device 155 to assist in increasing the temperature of any make-up water which has been added to the aqueous acid. Also, the heater 155 serves to assist in promoting circulation of the liquid within the tank 58. The heater 155 may be controlled according to the temperature of the aqueous acid in the vessel 158 as sensed by the element 66. From the heater device 155, the aqueous acid flows through conduit 157 for entry into the vessel 58 via aperture 159.

The purposes of the above-described system are to increase the temperature of any make-up water prior to its being added to the body of aqueous acid within the vessel 58, thereby to prevent thermal splattering or explosion, as well as to provide circulation within the body of acid within the vessel 58. The latter function is especially important to assure that the acid concentration throughout the vessel 58 is homogeneous, and thereby to assure that the etching conditions are uniform through the vessel. Accordingly, the inlet aperture 159 should be located a sufficient distance from the drain opening 150 that liquid does not flow directly from one to the other without causing appreciable mixing or circulation within the vessel 58.

FIG. 8 also shows level sensor means 141a and 141b mounted one above the other on the exterior sidewall of the vessel 58. These sensors should be understood to be essentially the same as the light-channel sensor 141 previously described in conjunction with FIG. 4. Likewise, the positioning member 149a is essentially the same as the previously described member 149. And it should be understood that associated sensors 143a and 143b (not shown) are provided to operate in cooperation with the sensors 141a and 141b just as the sensor 143 operates in conjunction with the sensor 141 of FIG. 4. The purpose and advantage of having two sets of sensors, one above the other, is that maintenance of a desired liquid level is readily provided. Thus, if the upper sensor pair is set at the maximum desired liquid level within the vessel 58 and the lower pair is set at the minimum desired level, an indication that liquid is present by the lower set of sensors and an indication that liquid is absent by the upper set of sensor results in the determination that an acceptable level of liquid is present and, further, that no make-up liquid or acid need be added.

It should be appreciated that the indications of liquid level provided by the level sensors 141a and 141b can be used to control the valve 169 which, in turn, determines the amount of make-up water added to the system. Thus, in operation, the valve 169 would be activated only if the sensors indicated a low level of liquid within the vessel 58.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. An improved acid bath comprising:
   (a) an outer housing including a base and a plurality of sidewalls connected to said base to define an enclosure having an open top;
   (b) an inner vessel for containing aqueous acid, said inner vessel having a bottom wall, a plurality of walls connected to said bottom wall to define a liquid-holding vessel having an open top, the inner vessel being sealingly mounted within the housing such that there is an enclosed space between the inner vessel and the walls of the outer housing;
   (c) non-opaque sections formed in the walls of the inner vessel;
   (d) liquid level sensor means including an infrared transmitter and receiver means located outside the outer housing, the level sensor means further including a first pair of light channel means optically connected to the transmitter and receiver means to extend therefrom into the outer housing;
   (e) means fixedly mounting the terminal end faces of the light channel means to the non-opaque sections of the inner vessel, without penetrating the walls, for transmitting and receiving optical signals through said non-opaque sections, which signals are carried to the infrared transmitter and receiver means to indicate the presence, or absence, of liquid within the vessel at the level at which the terminal end faces of the light channel means are located.

2. The acid bath of claim 1 wherein said pair of light channel means comprise fiber optic strands.

3. The acid bath of claim 1 wherein the inner vessel is rectangular in shape and said non-opaque sections are formed at a corner of the inner vessel and the respective teminal end faces of the light channel means are parallel to one another across said corner.

4. The acid bath of claim 3 wherein the means for mounting the respective terminal ends of the first pair of light channel means comprises:
   a member generally L-shaped in cross-section to fit about the right-angle corner of the inner vessel, said L-shaped member having a channel formed through both of its legs with a common centerline to provide a line of sight between the respective parallel end faces of the light channel means.

5. The acid bath of claim 2 wherein the infrared transmitter and receiver means includes means to transmit optical signals through one of the light channel means, and means to detect the reception of the signals through the other light channel means of the first pair of light channel means.

6. The acid bath of claim 5 further including:
   heating elements mounted between the outer housing and the inner vessel to heat liquid acid in the inner vessel; and
   said terminal ends of the pair of light channel means are mounted to detect the presence, or absence, of liquid acid at a level in the inner vessel above said heating elements.

7. The acid bath of claim 1 further including lid means hingedly mounted to the outer housing to sealingly close the open-top of the inner vessel, said lid means including means to condense vapor rising from the liquid acid contained by the inner vessel.

8. The acid bath of claim 1 further including:
a second pair of light channel means optically connected at their one ends to said transmitter and receiving means at their other ends mounted to the walls of the inner vessel at a location below the first pair of light channel means to transmit and receive optical signals through the non-opaque sections.

9. The acid bath of claim 1 wherein said non-opaque sections are formed of quartz or glass.

10. The acid bath of claim 1 wherein said liquid level sensor means includes signal processing means to transmit and receive optical signals via the first pair of light channel means, and to thereby indicate the presence, or absence, of liquid at the level in the inner vessel at which the light channel means are mounted.

* * * * *